United States Patent
Arganbright et al.

[15] 3,673,949
[45] July 4, 1972

[54] CONTINUOUS PAN CONVEYOR BAKING APPARATUS

[72] Inventors: Ned H. Arganbright; Paul J. Koepnick; Carl T. Nelson; Arthur E. O'Brien, all of Grand Rapids, Mich.

[73] Assignee: Werner Lehara, Inc., Grand Rapids, Mich.

[22] Filed: Sept. 16, 1970

[21] Appl. No.: 72,733

[52] U.S. Cl. ............................................................99/443
[51] Int. Cl. .........................................................A21b 3/06
[58] Field of Search..................107/57 R, 57 A, 57 D; 99/443

[56] References Cited

UNITED STATES PATENTS

| | | | |
|---|---|---|---|
| 2,445,884 | 7/1948 | MacManus | 107/57 A |
| 3,109,391 | 11/1963 | Lefever | 107/57 A |
| 3,345,957 | 10/1967 | Welch | 107/57 A |

*Primary Examiner*—Patrick D. Lawson
*Attorney*—Price, Heneveld, Huizenga & Cooper

[57] ABSTRACT

For baking a plurality of cakes or other edible products in pans which continuously pass through an oven, an endless pan and conveyor assembly is provided which travels along an endless path in first a forward direction through the baking oven and then return to the starting point in a return direction. The assembly includes a means along the conveyor for selectively removing the pans from the conveyor while moving in the return direction. Specifically, a plurality of brackets are provided on spaced conveyors. The brackets support the pans which span the distance between the spaced conveyors, the pans being removable by a camming mechanism associated with the conveying means. After the cakes are baked they are released from the pan by a conveying mechanism which holds the cakes while reversing their direction so that they are conveyed from the releasing mechanism in an upright position. Further operations on the cake include slicing the same by a novel slicing mechanism, topping one of the parts so sliced and then returning the parts to a station where they are placed together, such stations being spaced longitudinally along the conveyors by reason of a special type of conveyor mechanism.

24 Claims, 15 Drawing Figures

PATENTED JUL 4 1972 3,673,949

INVENTORS
NED H. ARGANBRIGHT
PAUL J. KOEPNICK
CARL T. NELSON
BY ARTHUR F. O'BRIEN

ATTORNEYS

PATENTED JUL 4 1972 3,673,949

INVENTORS
NED H. ARGANBRIGHT
PAUL J. KOEPNICK
CARL T. NELSON
BY ARTHUR F. O'BRIEN

ATTORNEYS

INVENTORS
NED H. ARGANBRIGHT
PAUL J. KOEPNICK
CARL T. NELSON
ARTHUR F. O'BRIEN
BY

ATTORNEYS

3,673,949

CONTINUOUS PAN CONVEYOR BAKING APPARATUS

BACKGROUND OF THE INVENTION

The prior art apparatus for continuously baking cakes have been of many different varieties. Basically two constructions have been utilized. The first of these is to place separate pans on conveyors previous to passing the conveyor through an oven and then removing the pans and subsequently removing the cakes from the pans. The pans are then returned to the original starting point by trucks or a separate conveyor where they are filled with the dough and then the baking process repeated. A second type of apparatus has been to construct a conveyor with built-in pans which were filled with dough, then passed through an oven, and then the cakes removed thereafter by many different means.

The above two constructions have not been satisfactory because of the inherent problems created thereby. The first described apparatus requires constant laborious and expensive handling of the pans, such handling creating other problems inherently involved in handling a tremendous number of pans such as the cleaning, drying and the like. The second above-described apparatus created the problem of not being able to remove and replace the pans without considerable effort and time involved therein which required the shutting down of the entire operation when the pans are damaged or are to be repaired or replaced.

Efforts have been made to provide pan and conveyor assemblies by which the pans could constitute an integral part of the conveyor but at the same time could be removed without too much difficulty, but to our knowledge, no one has accomplished this end to complete satisfaction.

Further, apparatus for releasing the cakes from the pans which formed integral parts of the conveyor have not been satisfactory. The handling of the cake thus removed and conveying it down a conveyor for subsequent operations also created difficult problems.

In the manufacturing of filled cake by first baking the cake, then slicing it, and then filling it with a filler material has also been accomplished in many different ways. However, to our knowledge, considerable difficulties have been experienced in the use of such apparatus.

SUMMARY OF THE INVENTION

The present invention is intended to eliminate the problems encountered by others as previously referred to. To this end, this invention relates to apparatus for continuously baking cakes in pans without having to handle the pans. The pans are automatically cleaned, dried, filled with dough and passed through an oven without being touched by human hands. Further, this apparatus includes an endless pan and conveyor assembly in which the conveyor and pans are substantially an integral conveyor but which has the distinct advantage of providing a means whereby the pans can be removed by an easy adjustment of a cam means which will cause the brackets which hold the pans to drop them at a predetermined point near the starting station. This construction permits pans to be removed without stopping the operation and also the quick replacement of new pans with very little difficulty.

This invention also relates to a novel means for releasing the cake from the pans and conveying the cake continuously in an upright position to subsequent stations for other operations. The release of the cake is done without an operator and the cake is handled without damaging the same. The individual cakes are also kept in a predetermined arrangement at substantially spaced positions for subsequent operations.

In accordance with this invention the subsequent operations include the splitting of the cake or other edible article into at least two parts and filling it with a filler material. The novel apparatus for accomplishing this operation includes a conveyor which branches into two conveyors. At the juncture of the single conveyor and the two conveyors is a slicing apparatus. The parts of the cake after being sliced are conveyed at different levels. Along one of the conveyors is a depositing apparatus which deposits a filler on one part. The two parts are subsequently brought together by the conveyors at stations where manually the two are placed together and subsequently conveyed down the line for additional operations.

This invention as briefly described can be best understood from a detailed description thereof made in conjunction with the accompanying drawings which include as follows:

DESCRIPTION OF THE PREFERRED EMBODIMENT

Figure 1A:
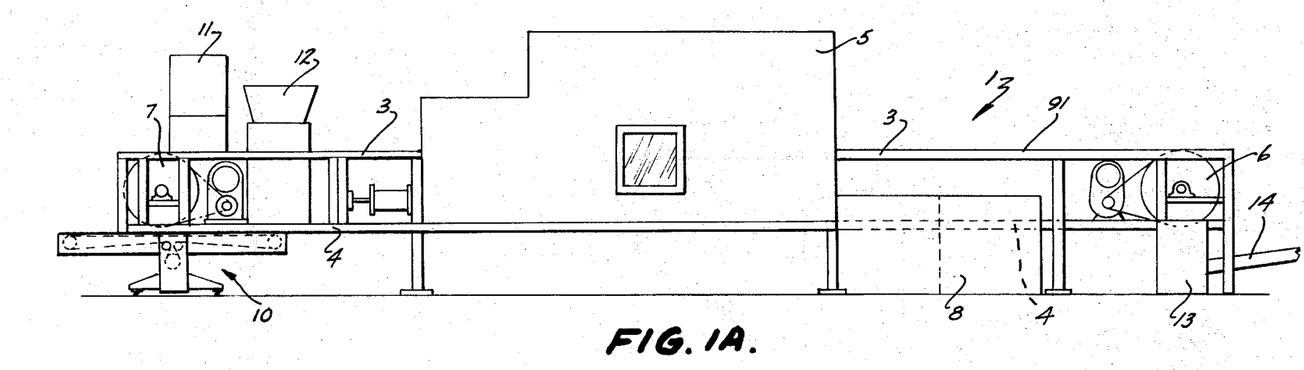
FIGS. 1A and 1B are side elevational views of a schematic lay-out of the apparatus of this invention showing the relationship of the various components thereof, FIG. 1B being a continuation of FIG. 1A.
Figure 1B:
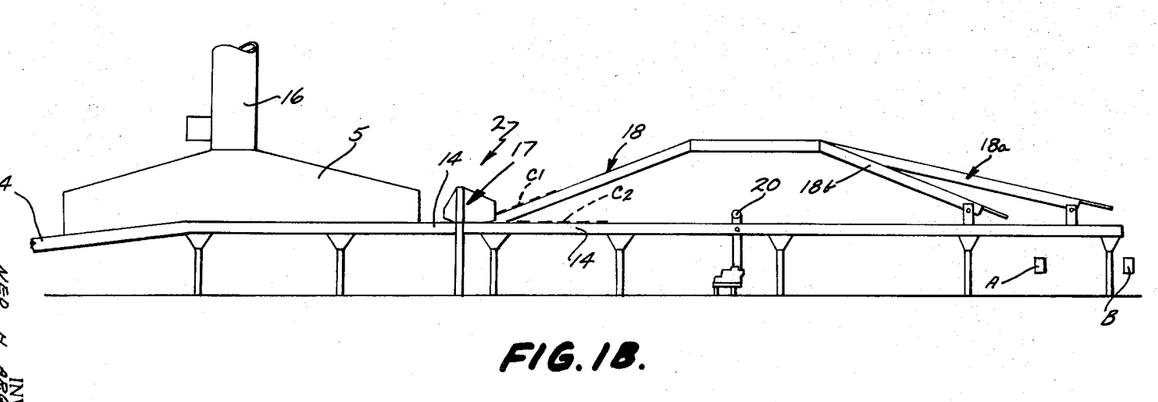

Referring specifically to the drawings, FIGS. 1A and 1B show the entire baking, slicing and filling lines which include the baking assembly 1 (FIG. 1A) and the cooling, slicing and filling assembly 2 (FIG. 1A) both of which are interconnected together to form one process line so that the entire operation from the start of depositing the dough in the pans to the completion of slicing and filling the cakes is accomplished on one continuous line with the only handling of the product by human hands being the placing or capping of the top layer on the filling deposited on the bottom layer.

The baking assembly 1 includes a continuous, endless conveyor and pan assembly comprising the upper track 3 and the lower track 4 both extending the entire length of the baking assembly 2. The tracks 3 and 4 carry the conveyor and pan assembly which will be described in detail in conjunction with FIGS. 3, 4, 5, 6, 7 and 8. The conveyor and pan assembly is driven by the drive pulleys 6 and 7 located at each end of the baking assembly. The pans are carried on track 3 in a forward direction through oven 5 and are returned on track 4 through the pan washer 8 and pan dryer 9. The pans can be selectively released from the conveyor on a pan removal conveyor by a mechanism which will be described in greater detail hereinafter. The baking assembly also includes the pan greaser 11 and the dough depositor 12, both of which are generally well-known in the art.

At the far right end of FIG. 1A is a cake releaser mechanism 13 for releasing the cake from the pans and placing them on the conveyor 14 in a predetermined arrangement. Continuing down on conveyor 14 on FIG. 1B, there is provided a plurality of cooling hoods 15 having exhaust stacks 16. Further down the line is the slitter or slicer mechanism 17 at which the conveyor 14 branches into an upper conveyor means 18 formed in two separate conveyors 18a and 18b for conveying the top part C1 of the cake as sliced by the slicing mechanism 17. The lower parts C2 are conveyed by the lower conveyor 14 which passes under a depositor 20 for depositing a filling material on each of the parts C2 of the cakes. The conveyors 14 and 18 then converge by means of the two separate conveyors 18a and 18b. These two conveyors are of different lengths and are arranged at a different angle to conveyor 14 in order to bring these parts carried thereby to different stations designated A and B, at which stations workers place the parts carried by the conveyors 18a and 18b upon the parts carried by conveyor 14 on which a filling has been deposited. This is frequently referred to as the capping operation.

Referring now specifically to FIGS. 2, 3, 4, 5, 6, 7 and 8, the conveyor and pan assembly as a whole is designated by reference numeral 30. This assembly includes roller chains or conveyors 31a and 31b comprising the rollers 32 mounted on the ends of the rods 33 and connected together by the links 34 so as to support the rods between the tracks 4. The rollers 32 roll or ride on the tracks 4 moving in a return direction and on tracks 3 (FIGS. 1A and 8) when moving in a forward direction. Thus, in effect, two spaced conveyor means are provided which are connected together by the rods 33. As disclosed in FIGS. 5 and 6, the rods 33 are arranged in pairs and each have reduced end portions 33a on which are slidably mounted the brackets 35 at each end of a pair of rods. The brackets are L-shaped thereby having the two flanges or legs 35a and 35b. The leg 35b has an opening 36 receiving the reduced portion 33a of the rod 33 thus providing the sliding relationship between the rods and the brackets. Coil springs 37 are mounted on the rods 33 between the leg or flange 35b of the bracket 35 and one of the links 34 of the roller chain conveyor providing biasing means which biases the bracket 35A toward the space between the two conveyor chains. As best disclosed in FIGS. 5 and 6, the leg 35b of bracket 35 has a nipple 38 also extending inwardly towards the space between the conveyor chains. Further, the leg or flange 35a of bracket 35 has inclined surfaces 39a and 39b providing, as will be described hereinafter, cam surfaces for engaging a cam which will force the bracket 35 outwardly against the bias of springs 37.

Figure 5:
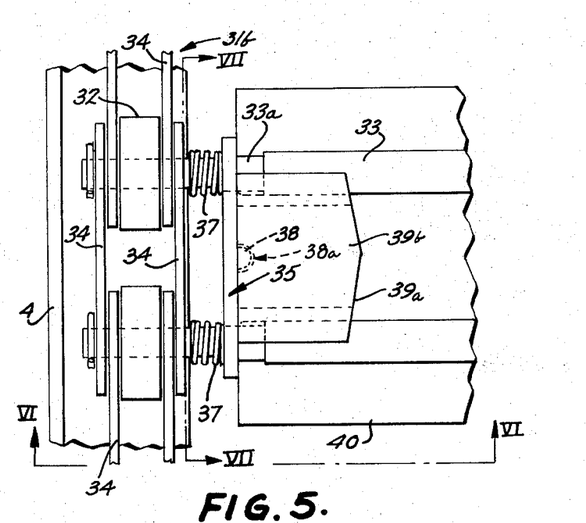
FIG. 5 is a plan view of one end of the conveyor and pan assembly.
Figure 6:
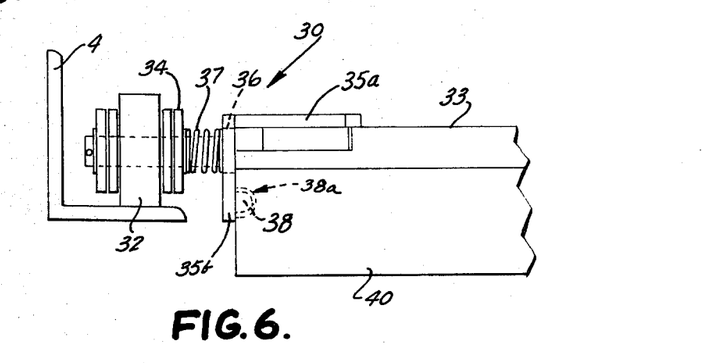
FIG. 6 is a cross-sectional view of one end of the conveyor and pan assembly taken along the plane VI—VI of FIG. 5.
Figure 7:
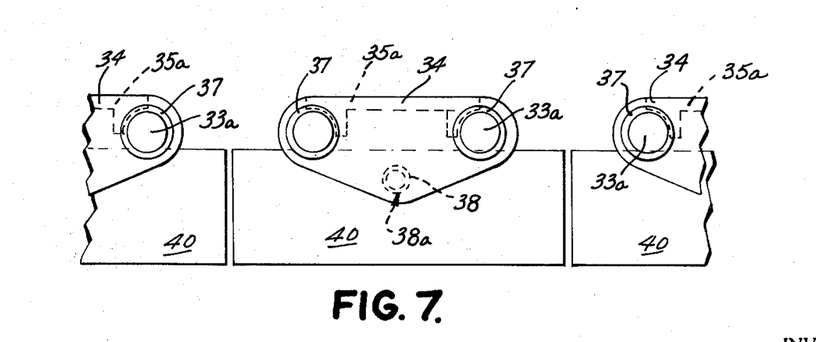
FIG. 7 is a cross-sectional view of one end of the conveyor and pan assembly taken along the plane VII—VII of FIG. 5.

The pans 40 are mounted between the two respective brackets of each pair of rods 33 with the nipple 38 extending into a recess 38a supporting the pans firmly between the two brackets. However, it should be understood that the pans can be removed by forcing the brackets 35 outwardly against the bias of springs 37 thus releasing the pans from the brackets.

It should be realized that FIGS. 5 and 6 disclose the pans being supported with the containers facing downwardly or in upside-down position. The pans assume this position when on the return track 4. On the other hand, when on the forward track 3, the pans, as shown in FIG. 8, face upwardly for receiving the dough and carrying the same through the oven as the cake is being baked in the ovens.

Figure 2:
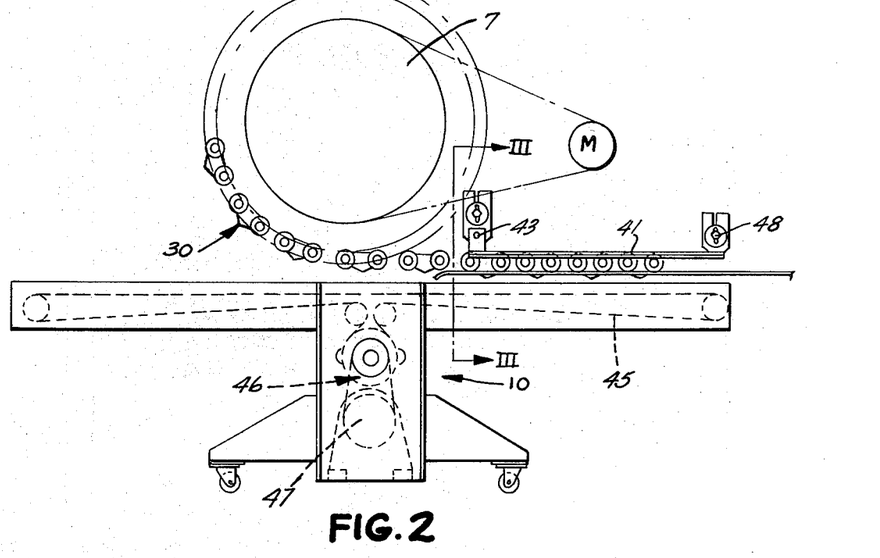
FIG. 2 is a partial side elevational view of the pan removal mechanism.
Figure 3:
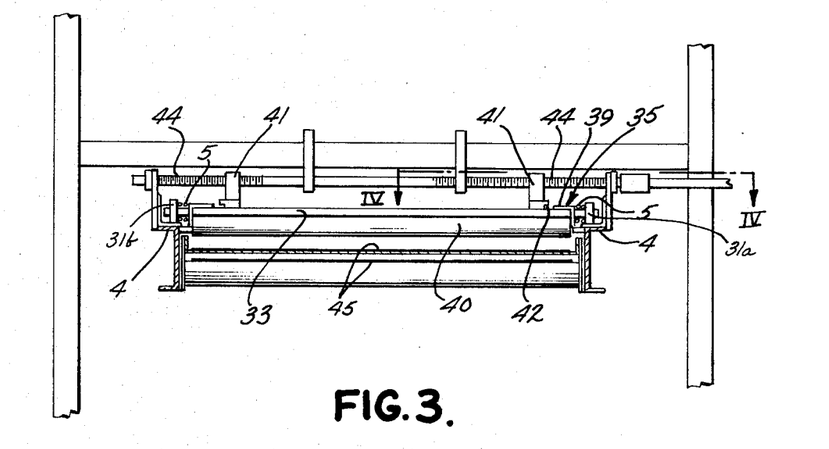
FIG. 3 is a cross-sectional view taken along the plane III—III of FIG. 2 and again illustrating the pan removal mechanism.
Figures 4, 8, 10, 14:
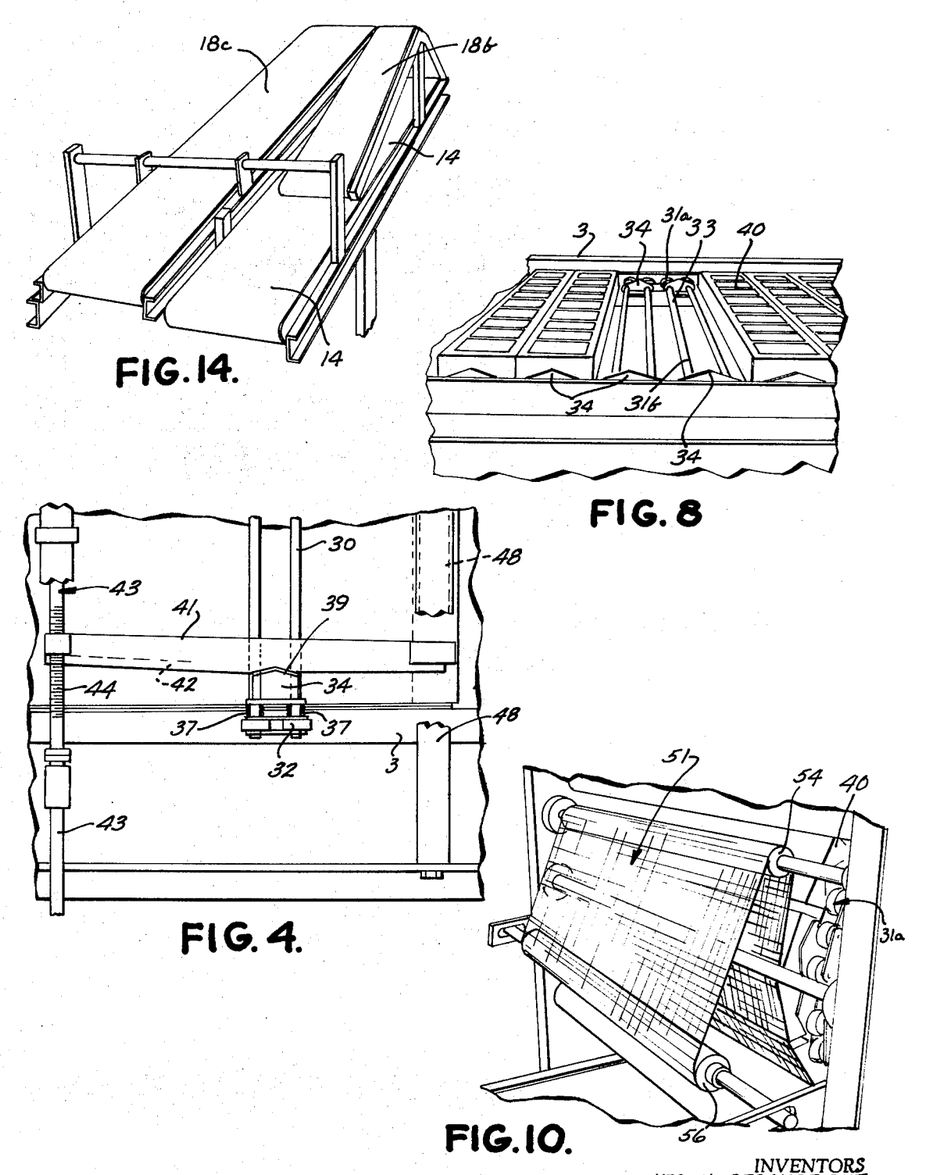
FIG. 4 is a cross-sectional view taken along the plane IV—IV of FIG. 3.
FIG. 8 is a perspective view of a section of the conveyor and pan assembly viewing it from the side and top.
FIG. 10 is a perspective view of the cake release mechanism or system.
FIG. 14 is a perspective view of the conveyor mechanism for the sliced product by which the top part thereof is presented to the lower conveyor at different stations spaced longitudinally of the conveyors.

FIGS. 2, 3 and 4 disclose in greater detail the means for camming the brackets outwardly for removing the pans from the conveyor and pan assembly. This mechanism includes a camming element or bar 41 threadedly mounted at one end on the threaded portion 44 of rod 43 and slidably mounted at its other end on the guide rod 48. The camming bar is located between tracks 4 (FIG. 3) and extends longitudinally of the tracks, the longitudinal extension thereof being maintained by the guide bar 48. This element 41 has a camming surface 42 arranged to engage the camming surfaces 39a and 39b of brackets 35 when adjusted to the proper position transversely of the track. As shown in FIG. 3 the camming element 41 is located inwardly of the camming surfaces 39 and as a result, in the position as shown, they would not actuate the brackets for releasing the pans 40. However, the positions of camming elements 41 are adjustable by turning or rotating a rod 43 which in turn rotates the threaded portions 44 threadedly engaged within the body of camming elements 41. Thus, the camming elements 41 can be adjusted inwardly or outwardly to either engage or not engage the camming surfaces 39 of the brackets 35. When not engaging the camming surfaces, the pans remain supported by the brackets 35 and continue to form the continuous and endless conveyor and pan assembly. However, when the camming surface 42 of the camming element 41 engages the camming surfaces 39 of bracket 35, the brackets are forced outwardly against the bias of springs 37 causing the pan to drop downwardly onto a pan removal conveyor 10 which is a transportable conveyor having a belt 45 driven by a pulley 46 which in turn is driven by the motor 47. Thus, as shown in FIG. 2, when the camming element 41 engages the brackets 35 and drops the pans, the pans drop on the belt conveyor 45 which conveys them in a direction shown by the arrow to the end of a conveyor from which they are removed by an operator.

Figure 9:
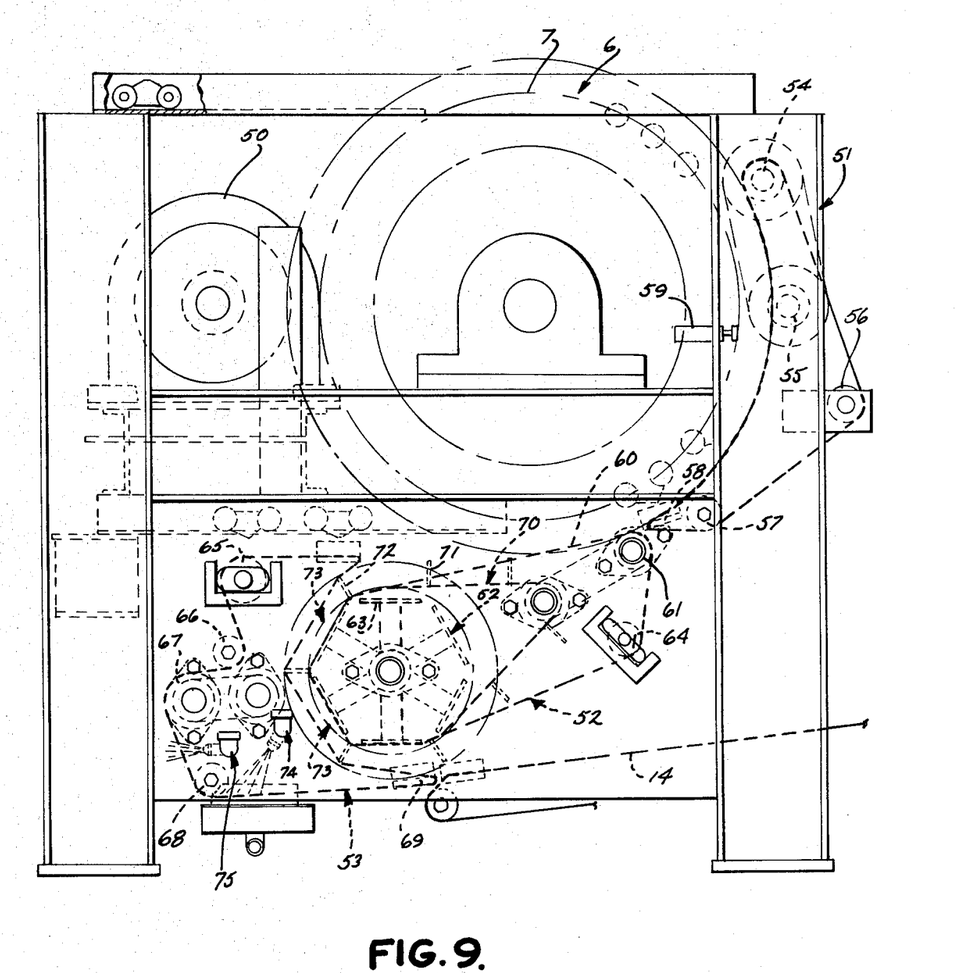
FIG. 9 is a cross-sectional view of the cake release mechanism or system by which the cake is released from the pans previous to their return to the starting point.

FIG. 9 discloses the cake release system or mechanism. Reference numeral 7 designates a drive pulley which drives the roller chain conveyor and consequently the conveyor and pan assembly. The drive pulley 7 is driven by the motor 50. In order to properly release the cakes from the pans, three distinct web conveyor mechanisms 51, 52 and 53 are provided.

The web conveyor mechanism 51 includes a drive pulley or shaft 54 and the idler pulley or sprockets 55, 56 and 57. Adjacent idler pulley 57 is a guide element 58 provided to make the web conform to the nose-like shape as shown. The web is constructed, as shown in FIG. 10, of a material which has a plurality of mesh openings or apertures so as not to completely cover and smother the cake but to merely hold the cake in place. Web conveyor 51 holds the cake in place within the pans until the pans reach a substantially upside-down or inverted position. Intermediate the upright and inverted position is provided a means for either vibrating or tonking the pans so as to give a shock or motion to the pans which will cause the cakes to separate from the surfaces of the pans. This so-called vibrating or tonking device is illustrated schematically by reference numeral 59, it being understood that any satisfactory means can be provided for loosening the cakes from the pans. Examples of such means could include an air hammer, an electrical vibrating element or any other number of suitable means.

The web conveyor mechanism 52 is provided for the purpose of supporting the cakes as they fall out of the pans when the pans are in the inverted or upside-down position. The web conveyor mechanism 52 thus provides a slightly inclined but flat surface section 60. As shown, the webbing of the conveyor is constructed of the same open mesh material as the conveyor 51. It is driven by the dividers 71 of divider conveyor mechanism 70. The mesh passes about the pulley or sprocket 62 which has rectilinear sides forming a hexagon. The mesh also rides about the take-up roller 64.

In order to encapsulate or contain each of the cakes in separate compartments and to singulate them in rows, the web conveyor 53 is provided which as shown rides on the pulleys or sprockets 65, 66, 67, 68 and also on the guide element 69. As disclosed, a divider conveyor mechanism 70 is also provided which has a plurality of dividers 71 secured thereto which extend through the openings of the mesh of the conveyor 52 and in conjunction with the web conveyor 53 forms separate compartments 73 enclosed by dividers and the web of conveyors 52 and 53. These compartments are provided in order to maintain the proper spaced position between the cakes as they are turned right side up, reversed in direction, and then conveyed by conveyor 14 for subsequent operations which will be later described.

As disclosed in FIG. 9, a steam spray nozzle 74 and an air spray nozzle 75 are provided for cleaning and sanitizing the web of conveyor 53.

Figure 11:
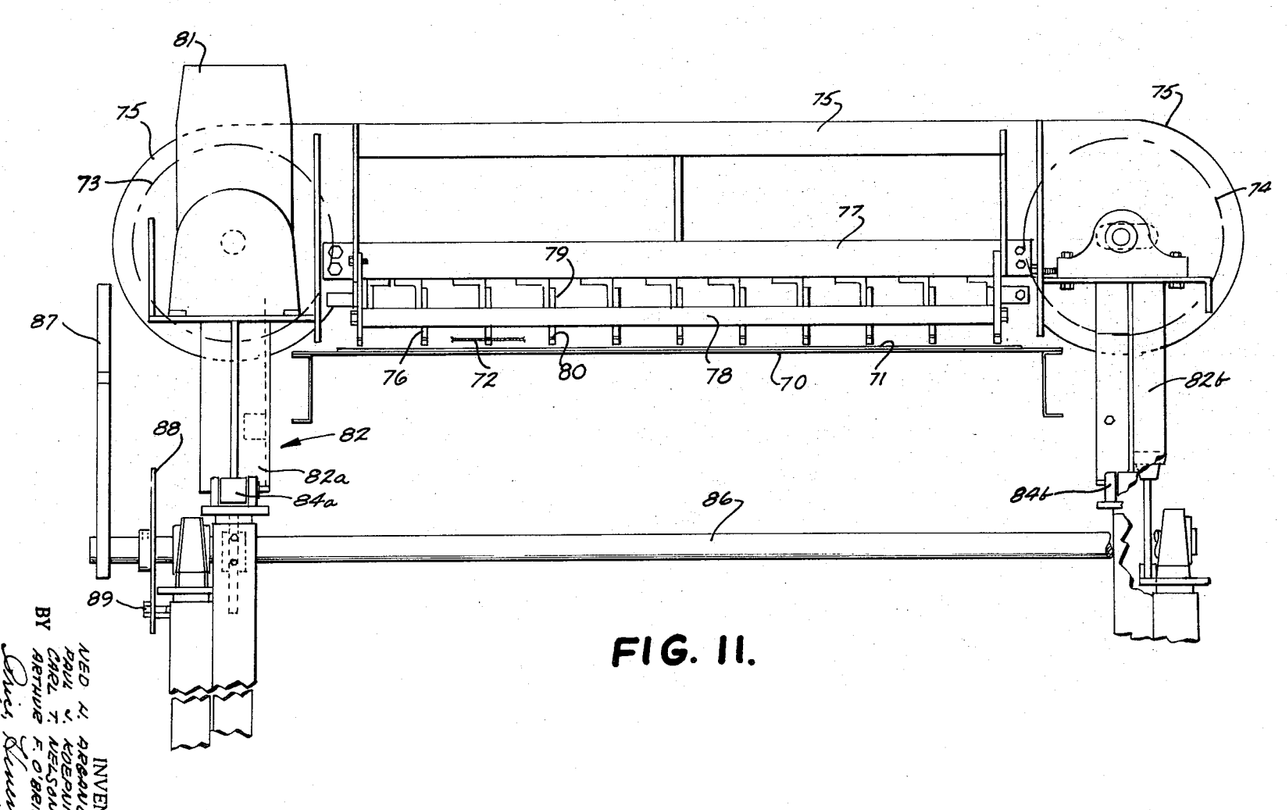
FIG. 11 is a cross-sectional view taken along the conveyor mechanism at the cake slitter and illustrating the construction of the slitter or slicer means.
Figure 12:
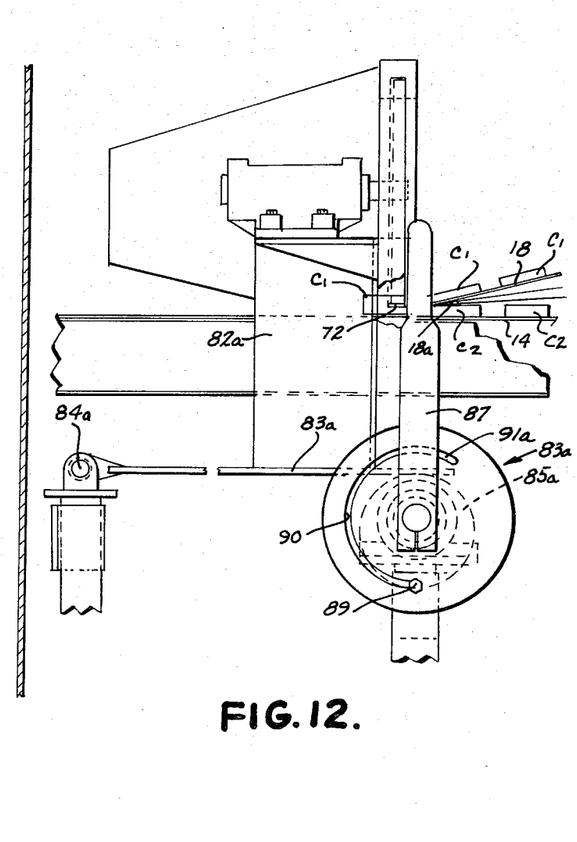
FIG. 12 is a side-elevational view of the slitter mechanism looking at it from one side of the conveyor.
Figure 13:
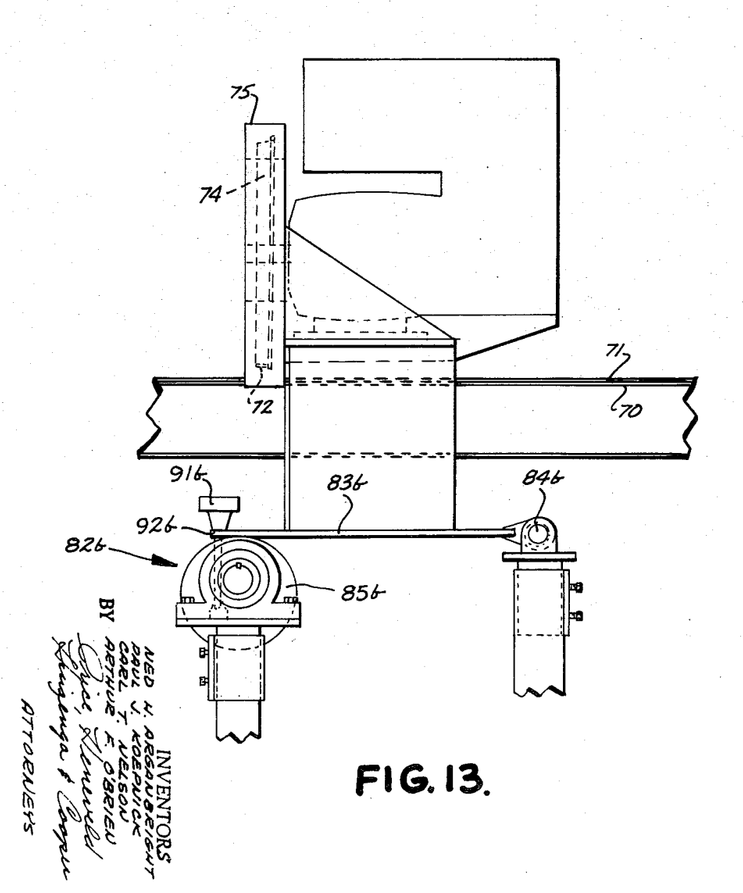
FIG. 13 is a side-elevational view of the slitter looking at it from the other side of the conveyor.

After being placed on conveyor 14 the cakes are passed through openings hoods 15 and then to a slitter or slicer mechanism 17, the details of which are disclosed in FIGS. 11, 12 and 13. Reference number 70 designates a conveyor bed on which a belt 71 is driven. Above the conveyor bed 70 and conveyor belt 71 is mounted a band cutter or slicer having a band saw blade 72 extending around the sheaves 73 and 74 on each side of the conveyor. The sheaves and the saw blade are mounted in a housing 75 having walls extending around the tops and sides. At the bottom there are a plurality of guides 76 supported on the cross member 77 and held in rigid position by the cross bar 78 extending through opening 79 in each of the guides 76. The guides have the saw blade receiving openings 80 for guiding the saw blade as it travels on an endless path around the sheaves 73 and 74 which are driven by motor 81.

In order to properly adjust the saw blade 72 at a desired height, an adjusting mechanism is provided which includes a support frame 82 on each side of the conveyor. The frames 82a and 82b are mounted on the levers 83a and 83b. These levers 83a and 83b are supported on pintles 84a and 84b, respectively. The pivotal position of the levers 83a and 83b are determined by the cams 85a and 85b also located on each side of the conveyor, the position of which are controlled by the pivoting thereof through the rod 86 by means of the actuating or lever arm 87. Thus, rotation of arm 87 in either direction will cause levers 83a and 83b to be moved to change the position of the entire slicer or slitter assembly including the motors, the sheaves, the housing, the blade guides, the blade, and other associated parts of the assembly. As disclosed, a locking plate 88 is provided on the shaft 86 for locking the rod or shaft 86, and consequently the entire assembly, in position. This is accomplished by tightening the nut 89 which rides in a groove 90. Also provided are the locking handles 91a and 91b each of which are adapted for pivoting into a notch 92a and 92b, respectively, for holding the levers 83a and 83b against the adjusting cams 85a and 85b, respectively.

FIG. 12 discloses the means for slicing the cake, designated as C, into two distinct parts C1 and C2 and conveying them on different conveyors so as to temporarily separate the two in order to deposit a filling on the part C2. As disclosed, the elevator conveyor 18 is provided which has a nose portion 18a that protrudes into the space between the two parts as the cake is being sliced. Upon completion of the slicing the conveyor 18 carries the top part C1 upwardly away from the bottom part C2. Thus, this is the start of the slicing and filling operation. As previously described, the upper parts C1 are carried by the elevator 18 upwardly as disclosed in FIG. 1B. The lower part C2 is carried along by the conveyor 14 to a depositor 20 of any conventional type which deposits a filling on the part C2. As also disclosed in FIG. 1B, the conveyor 18 is divided into two parts 18a and 18b, one of which is inclined at a different angle and is of different length than the other. The reason for this is to present the top parts C1 at different longitudinal positions A and B along the conveyor 14 so that operators which are placing the top C1 on the filled bottom part C2 can be spaced longitudinally one from the other along the conveyor so as to perform the so-called "capping" operation without interfering with one another. This construction is shown schematically in FIG. 1B and in perspective in FIG. 14 wherein 18B is shown substantially shorter and inclined at a greater angle than 18C. Thus workers standing along the line will not interfere with one another.

OPERATION

The operation of the apparatus of this invention should be obvious from the above description. Briefly, when in operation, the driving pulleys or sprockets 6 and 7 are driving the conveyor and pan assembly 30 along a continuous endless path starting at the greaser 11. At the greaser station, the pans are greased and then carried to the depositor 12 which deposits dough in each of the pans. The pans at that particular section of the conveyor then move along the tracks 3 in a forward direction through the oven 5 and in emerging therefrom pass underneath the heat retention covers 91. When the pan reaches driving pulley 6 it passes into the cake release mechanism or system (FIG. 9) and in so doing the web conveyor 51 holds the cakes in the pans while the pans are traveling around the pulley 6 from an upright to an inverted position. Shortly after making a 90° turn the pans are vibrated or tonked causing the cake to be vibrated loose from the surface of the pan. When the pans are substantially in an upside-down or inverted position they pass out of contact with the web conveyor 51 which permits the cakes to fall with their tops down onto the inclined surface 60 of the web conveyor 52. The web conveyor 52 carries the cakes in a clockwise direction, or to the left as viewed in FIG. 9, and as each cake is thus carried the dividers 71 of the divider conveyor 70 projects between each of the cakes. These dividers 71 contact the web of the web conveyor 53 and in effect form a compartment in which the cake is located. In other words, the cake is completely encapsulated within the webs of the web conveyors 52 and 53 and within the dividers 71. While being so encapsulated, the direction of the travel of the cakes is completely reversed so as to travel in the same direction as the forward direction of the conveyor and pan assembly. When thus traveling in this direction they are carried onto the conveyor 14 from whence the cakes in predetermined spaced position are carried under the cooling hoods 15 to the slicer mechanism 17.

At the slicer mechanism the band saw blade which has been adjusted for slicing the cake at the proper level, slices the cake in two along the horizontal plane. During this slicing operation, as disclosed in FIG. 12 the top part C1 is separated from the bottom part C2 by the inclined conveyor 18 which carries the top parts C1 upwardly in a direction diverging away from the bottom parts C2 carried by the conveyor 14. The conveyor 14 conveys the bottom parts C2 to a depositor of a rotating type which deposits a filling such as a cream onto the bottom parts C2 while being conveyed. The bottom parts C2 are then continued to be conveyed by the conveyor 14 to the stations A and B at which operators manually perform the capping operation of placing the top parts C1 on the filled or creamed parts C2. The composite cake is then carried along for other operations such as icing and packaging.

Referring back to the conveyor and pan assembly, it will be noted from FIG. 9 the conveyor pan assembly after dropping the cakes is returned via the lower track 4 to the original starting point. Before returning to the original starting point, the pans are carried through a pan washer 8 and a pan drier 9 (FIG. 1A).

Should the operator of the machine desire to remove any of the pans for any reason whatsoever such as to change product or replace damaged pans, he can easily do so by rotating the shaft 43 (FIGS. 3 and 4) in the proper direction for causing the cam element or cam bar 41 to move inwardly for engagement with the cam surfaces 39 of the brackets 35. When so positioned, the cam elements force the brackets outwardly against the bias of the springs 5, thus, causing the nipples 38 to be forced out of the openings 38a of the pans. This releases the pans which when the conveyor and pan assembly are located on the lower track 4 permits the pans to fall downwardly onto the pan removal conveyor 10 which removes the pans by means of the belt conveyor 45 to a position where the operators can do with them whatever is required. Subsequently, a new pan can replace an old pan by simply forcing the brackets 35 outwardly and inserting the pans and permitting the brackets to be biased inwardly into a supporting position with the nipples 38 within the recesses 38a.

It should be readily evident that we have provided a continuous pan conveyor baking apparatus which is simple in construction but which at the same time provides for easy replacement of the pans, provides for satisfactory release of the cakes from the pans, provides for subsequent operations of slicing and filling the cakes in a manner in which heretofore to our knowledge has never been accomplished.

It should be understood that although we have disclosed the preferred embodiments of our invention, there are many modifications and embodiments thereof that can be provided without departing from the spirit of this invention. Therefore, such modifications and embodiments shall be considered as included within the scope of this invention unless otherwise expressly eliminated by the language of the appended claims.

The embodiments of the invention in which an exclusive property or privilege is claimed are defined as follows:

1. Apparatus for baking a plurality of individual cakes in pans conveyed through an oven means comprising: an endless conveyor means arranged to pass through said oven means along a continuous and endless path extending from a starting point in first a forward direction and then returning to said starting point in a return direction; a plurality of pans; means for mounting said pans on said conveying means for being carried thereby throughout said continuous and endless path; and means along the conveyor for selectively removing said pans from said conveyor while said conveyor is moving and without interrupting the movement thereof.

2. The apparatus of claim 1 in which the conveyor means comprises spaced conveyor means and said pans span the distance between said spaced conveyor means; and means for removably supporting said pans at each end thereof to one of said spaced conveyor means.

3. The apparatus of claim 1 in which the continuous and endless path in the forward direction is located on one plane and in the reverse direction is located on a different plane whereby the pans in moving from one plane to the other are oriented from a top-up position to an upside-down position.

4. The apparatus of claim 1 in which the continuous and endless path in the forward direction is located on one plane and in the reverse direction is located on a different plane whereby the pans in moving from one plane to the other are oriented from a top-up position to an upside-down position; and means is provided for releasing the cakes from said pans at locations between said forward and return directions.

5. The apparatus of claim 4 in which the means for releasing the cakes includes means for conveying said assembly generally in the forward direction; means for reversing the direction of said assembly while causing the pans to be oriented upside-down; means for holding the cakes dropped out of said pans and while holding said cakes conveying them first in said reverse direction and then subsequently again reversing the direction thereof so as to convey them in said forward direction for subsequent operations.

6. The apparatus of claim 2 in which the means for supporting the ends of said pans each comprise a bracket on each spaced conveyor means biased in a direction toward the space between said spaced conveyor means; and means associated with said pans and brackets for supporting an end of said pans on said brackets.

7. The apparatus of claim 6 in which the means associated with said pans and brackets includes mating portions on said pans and brackets whereby said brackets support said pans by being biased thereagainst so as to cause said mating portions to be cooperably mated.

8. The apparatus of claim 6 in which the spaced conveyor means are interconnected by a plurality of elongated connecting means; and said brackets are slidably mounted on said connecting means.

9. The apparatus of claim 2 in which said brackets include cam means; and cam actuating means is provided along said path for engaging said cam means to force said brackets against the bias thereof to release said means for supporting said pans.

10. An endless pan and conveyor assembly comprising spaced conveyor means; an array of pans spanning the distance between said spaced conveyor means; and means for removably supporting said pans at each end thereof to one of said spaced conveyor means, said supporting means comprising:

a bracket on each spaced conveyor means biased in a direction toward the space between said spaced conveyor means; and means associated with said pans and brackets for supporting an end of said pans on said brackets.

11. The apparatus of claim 10 in which the means associated with said pans and brackets includes mating portions on said pans and brackets whereby said brackets support said pans by being biased thereagainst so as to cause said mating portions to be cooperably mated.

12. The apparatus of claim 10 in which the spaced conveyor means are interconnected by a plurality of elongated connecting means; and said brackets are slidably mounted on said connecting means.

13. The apparatus of claim 10 in which said brackets include cam means adapted for engagement by a cam actuator whereby said brackets are forced against the bias thereof to release said means for supporting said pans.

14. In a releasing means for releasing baked cakes from an endless pan and conveyor assembly comprising: means for conveying said assembly generally in one direction; means for reversing the direction of said assembly while causing the pans to be oriented upside-down; means for holding the cakes dropped out of said pans and while holding said cakes conveying them first in said reverse direction and then subsequently again reversing the direction thereof so as to convey them generally in said one direction.

15. The releasing means of claim 14 in which a means is provided for imposing a vibration to said pans to cause at least surface separation of the cake therein from said pans.

16. The releasing means of claim 14 comprising a first endless web member for holding the cake in the pans until the pans are oriented substantially upside-down; and second and third endless web members for holding the cake while being conveyed in said reverse direction to said one direction.

17. The releasing means of claim 16 in which a fourth conveyor means is provided with divider members extending through said second endless web member for providing means for holding at least some of said cakes separate from one another.

18. The releasing means of claim 17 in which a means is provided for imposing a vibration to said pans to cause at least surface separation of the cake therein from said pans.

19. An apparatus for forming a sandwich from one piece of edible material comprising: a first conveyor means; second and third conveyor means branching from said first conveyor means along different planes; and slicer means at the juncture of said first, second and third conveyor means at a position whereby the one piece of edible material is carried by said first conveyor means to said slicer and the two sliced parts are conveyed away at different levels for subsequent superimposition one on the other.

20. The apparatus of claim 19 in which the slicer means is a continuous band extending transversely across said first conveyor means.

21. The apparatus of claim 20 in which the slicer means is a component of a slicer assembly including a motor and transmission means; support means for supporting the entire slicer assembly; and adjustable means for adjusting the position of said support means and thereby said slicer means with respect to said first conveyor.

22. The apparatus of claim 19 in which the said second and third conveyors diverge and subsequently converge; and depositing means over said second conveyor between said positions where said second and third conveyors diverge and converge for depositing a filler on said sliced part conveyed by said second conveyor at a time and position before said conveyors converge.

23. The apparatus of claim 22 in which the third conveyor means is separated into two downwardly inclined conveyors the lengths and angles of inclination thereof being different so as to present the said parts thereon at longitudinally spaced positions along the second conveyor means.

24. A mechanism for handling a plurality of at least two different parts to be joined together to form a sandwich comprising: a first conveyor means for conveying a plurality of one of said parts along a given plane; a second conveyor means spaced above said first conveyor for conveying a plurality of the other of said parts along a plane spaced above said first plane; said second conveyor means being separated into two downwardly inclined conveyors the lengths and angles of inclination thereof being different so as to present the said other parts at longitudinally spaced positions along the first conveyor means.

* * * * *